UNITED STATES PATENT OFFICE.

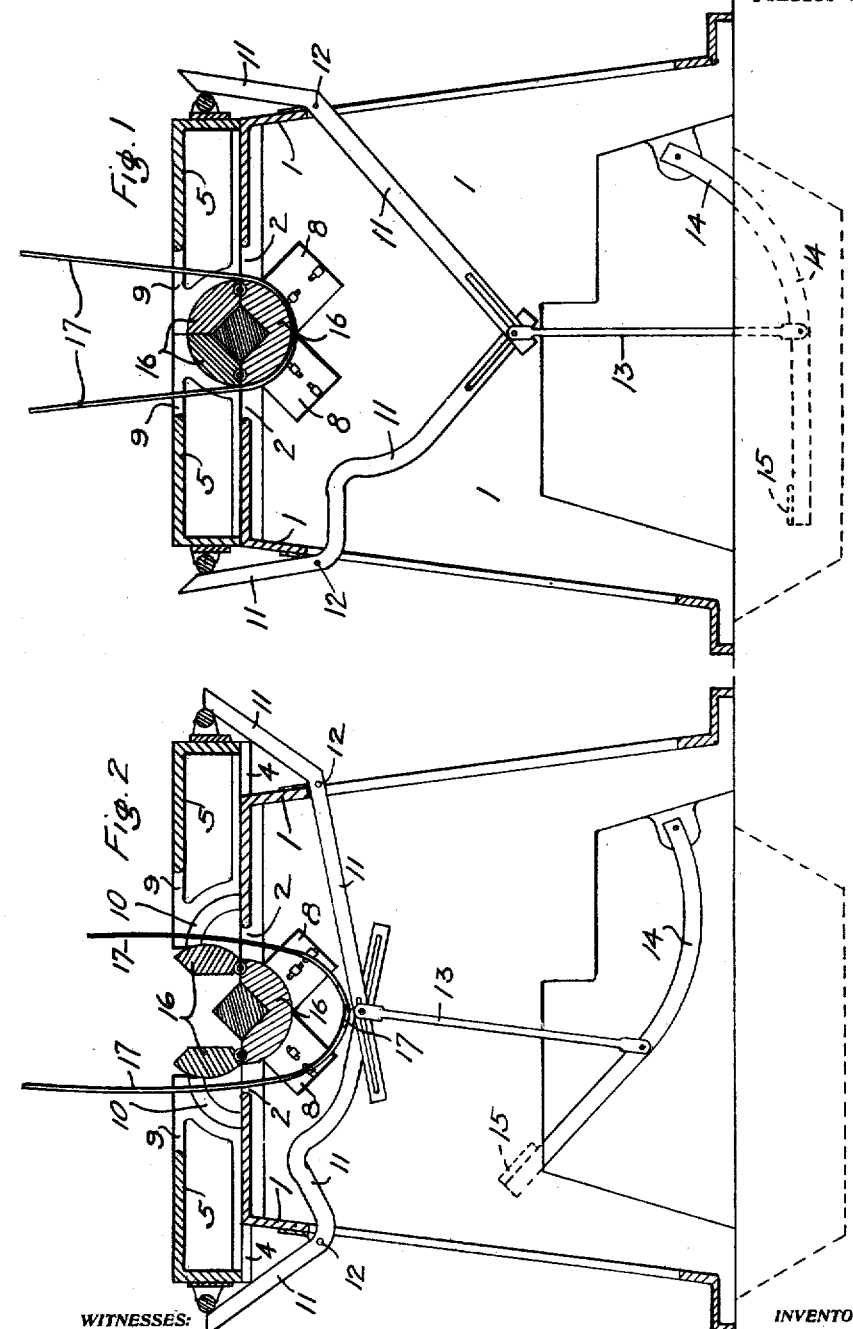

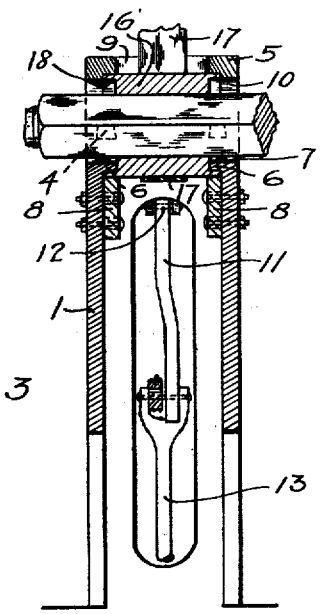

JOHN BUFFELEN, OF TACOMA, WASHINGTON.

BEARING FOR COLUMN-TURNING MACHINES.

No. 916,942.  Specification of Letters Patent.  Patented March 30, 1909.

Original application filed August 31, 1906, Serial No. 332,819. Divided and this application filed October 19, 1908.
Serial No. 458,567.

*To all whom it may concern:*

Be it known that I, JOHN BUFFELEN, a citizen of the United States of America, residing at Tacoma, in the county of Pierce and State of Washington, have invented certain new and useful Improvements in Bearings for Column-Turning Machines, of which the following is a specification, reference being had therein to the accompanying drawing.
This invention relates to devices for supporting a rotating column timber in a lathe and has for its objects to provide suitable means whereby the column may be placed in position in the lathe or removed therefrom without having to pass it endwise through the bearings, thus saving much time and labor in handling the column timbers. I attain this object by the devices and mechanisms illustrated in the accompanying drawings, in which—

Figure 1 is a vertical longitudinal section of a standard having a timber secured therein; Fig. 2 is a similar view showing the positions of the parts when the column timber is to be placed in or removed from the lathe; Fig. 3 is a vertical cross-section of the standard; Fig. 4 is an end view thereof; Fig. 5 is a plan thereof when the parts are in the positions shown in Fig. 2; and Fig. 6 is a similar view when the parts are in the positions shown in Fig. 1.

Similar numerals of reference refer to similar parts throughout the several views.

The standard 1 supporting my improved bearing is made hollow as plainly shown in the drawings. The top of the standard 1 is smooth and flat and at a level with the axis of rotation of the column, and has a central hole 2 therein. Two countersunk or dovetail grooves 3 extend across the top of the standard 1 at right angles to the axis of rotation of the column, and are adapted to receive the tongues 4 formed on lower edges of the sliding tops 5. Semi-circular flanges 6 project inward from the sides of the standard 1 and surround semi-circular openings 7 therethrough, the said flanges 6 being adapted to enter into the end cavities of the cylindrical column holder (Fig. 3) and the said openings 7 being large enough to allow the square timber out of which the column is to be turned to rotate on its axis without touching the standard 1. A pair of bearing plates 8 are removably and adjustably bolted to each of the inner sides of the standard 1

(Figs. 1, 2 and 3), the bearing edges of said plates being concentric with the semi-circular flanges 6 and spaced therefrom so as to bear below the outer surface of the cylindrical column holder, which is supported from downward movement thereby, and which is kept from upward movement, under the tension of the belt, by the said semi-circular flanges 6 which enter and engage in the circular cavities in its ends. The central axis of the flanges 6, openings 7 and bearing surfaces of the plates 8 is the axis of rotation of the column holder and lies in the plane of the top of standard 1.

As indicated above, the standard is provided with a pair of sliding tops 5. These tops are similar and are adapted to slide horizontally on the top of the standard 1, the dovetail tongues 4 thereof fitting in the parallel grooves 3 in the standard. In their closed position (Figs. 1 and 6) the tops meet vertically over the central axis of rotation of the column while in their open position (Figs. 2 and 5) they are withdrawn from each other so as to leave a free space over the column holder. The tops 5 are made hollow with a central belt space 9 at their inner ends, and have their sides cut away (at the inner ends) at 10 (Fig. 2) to fit around the cylindrical column holder and to allow the square timber of the column to rotate without touching it. The upper edges of the two tops 5 meet above the center of the column and are beveled off very slightly in opposite directions (Fig. 6). The parts 10 of the sides of the sliding tops 5 complete the bearings for the column holder and act in conjunction with the flanges 6 and plates 8 above described. The sliding tops 5 are pressed into place by means of the levers 11 which are each pivoted at 12 to the standard 1 and are both connected by the link 13 to the foot lever 14, which is pivoted to the base of the standard 1. The levers 11 are arranged in the central plane of the standard and are shaped so as to pass from the outside into the inside thereof, the link 13 acting practically vertically under the center point of the standard. The foot lever 14 is bent near its end so that the foot-board 15 thereof is outside of the standard 1. Thus by stepping on the board 15 both the levers 11 are moved so that their upper outer ends are pressed toward the central axis of the machine. These upper outer ends of the levers 11 engage the ends of the sliding tops 5 in the center thereof to press them together and thus complete the bearing for the column holder. When the lever 14 is released the tops 5 may be moved outward by hand, by weight, or by spring.

The column holder consists of a cylindrical body 16 having a shaped axial hole therein adapted to receive the column. This body 16 is constructed in sectors, suitably hinged together, so that by opening said sectors access may be had to the shaped hole for the column. The column holder is supported at its ends by the plates 8 and extends across the space between the sides of the standard 1. It is rotated by a belt 17 which engages its central part and which passes through the openings 2 and 9 in the standard 1 and sliding tops 5. The cylindrical column holder 16 is provided at each end with a cavity 18 into which the semi-circular flanges 6 on the standard 1 fit. This bearing is especially intended for use on my porch column turning and boring machine for which I have made application for Letters Patent (Serial No. 332819).

Having described my invention, what I claim is:

1. In a bearing for column-turning machines, the combination of a supporting standard with a semi-circular bearing formed therein; two similar complementary castings, sliding on said standard in opposite directions on a horizontal plane, transversely of the axis of said bearing, and each provided with a complementary quadrant bearing completing the circle of said bearing; two similar but opposite levers pivoted to said standard and engaging said sliding castings to press them together; and a foot-lever engaging both of said levers whereby said levers are actuated.

2. In a bearing for column-turning machines, the combination of a supporting standard with two parallel semi-circular bearings formed therein with free space therebetween; a rotating cylindrical body supported by said bearings and extending across the free space therebetween, and being engaged and rotated by a belt engaging it in the space between the bearings; two similar complementary castings, sliding on said standard in opposite directions on a horizontal plane, transversely of the axis of said bearings, and each provided with two complementary quadrant bearings completing the circles of said bearings, and having free space therebetween; two similar but opposite levers pivoted to said standard and engaging said sliding castings to press them together; and a foot lever engaging both of said levers whereby said levers are actuated to hold said quadrant bearings in contact with said rotating cylindrical body.

3. In a bearing for column-turning machines, the combination of a supporting standard with two parallel semi-circular bearings formed therein with free space therebetween; a rotating cylindrical body supported by said bearings and extending across the free space therebetween, and being engaged and rotated by a belt engaging it in the space between the bearings; guideways formed on said standard on each side of the axis of said pulley and at right angles thereto and being parallel with the dividing plane of said semi-circular bearings; two castings sliding in said guideways and each having two quadrant bearings formed on the sides thereof, the bearings of one casting being complementary to the opposite bearings on the other casting, to form two semi-circular bearings completing the bearings with said semi-circular bearings in the standard; two similar but opposite levers pivoted to said standard and engaging said sliding castings to press them together so that the quadrant bearings will be concentric with said fixed semi-circular bearings; and a foot-lever engaging both of said levers whereby said levers are actuated.

4. In a bearing for column turning machines, the combination of a supporting standard with a semi-circular bearing formed therein; guideways formed in the upper surface of said standard on each side of said bearing therein; and two castings mounted in said guideways to complete the circle of the bearing, said castings being adapted to be slid away from the bearing and from each other to permit the removal therebetween of the object in the bearing.

5. In a bearing for column turning machines, the combination of a supporting standard with semi-circular bearings formed therein; guideways formed in the upper surface of said standard on each side of said bearings therein; and two complementary castings mounted in said guideways and each provided with complementary quadrant bearings completing the circles of said bearings, said castings being adapted to be slid away from the bearings and from each other to permit the removal therebetween of the object in the bearing.

6. In a bearing for column-turning machines, the combination of a supporting standard with parallel co-axial semi-circular bearings formed in its two sides, with belt-space therebetween, said bearings being joined by the upper portion of said standard; guideways formed in the upper portion of said standard on each side of the axis of said bearings and at right angles thereto; and two complementary castings mounted in said guideways and each provided with two parallel co-axial quadrant bearings, complementary to each other and in the same vertical planes with the semi-circular bearings, said quadrant bearings completing the circles of the two bearings, with belt-space therebetween, and said castings being adapted to be slid in the guideways away from each other and from the bearings to permit the removal therebetween of the object in the bearings.

7. In a bearing for column-turning machines, the combination of a supporting standard with parallel co-axial semi-circular bearings formed in its two sides, with belt-space there-between, said bearings being joined by the upper portion of said standard; guideways formed in the upper portion of said standard on each side of the axis of said bearings and at right angles thereto; two complementary castings mounted in said guideways and each provided with two parallel co-axial quadrant bearings, complementary to each other and in the same vertical planes with the semi-circular bearings, said quadrant bearings completing the circles of the two bearings, with belt-space there-between, and said castings being adapted to be slid in the guideways away from each other and from the bearing to permit the removal therebetween of the body in the bearings; and a cylindrical body journaled in both of said bearings and extending therebetween and adapted to be engaged and rotated by a belt between said bearings.

In testimony whereof I affix my signature in presence of two witnesses.

JOHN BUFFELEN

Witnesses:
   B. P. PIERCE,
   A. M. RICHARDS.